US010873628B2

(12) United States Patent
Muthiah et al.

(10) Patent No.: US 10,873,628 B2
(45) Date of Patent: Dec. 22, 2020

(54) SYSTEM AND METHOD FOR NON-INTRUSIVE CONTEXT CORRELATION ACROSS CLOUD SERVICES

(71) Applicant: Oracle International Corporation, Redwood Shores, CA (US)

(72) Inventors: Ganesh Muthiah, Bangalore (IN); Sreekanth Anumula, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 95 days.

(21) Appl. No.: 15/621,454

(22) Filed: Jun. 13, 2017

(65) Prior Publication Data

US 2018/0359317 A1 Dec. 13, 2018

(51) Int. Cl.
*H04L 29/08* (2006.01)
*H04L 29/14* (2006.01)

(52) U.S. Cl.
CPC .......... *H04L 67/1097* (2013.01); *H04L 67/36* (2013.01); *H04L 69/40* (2013.01)

(58) Field of Classification Search
CPC ...... H04L 67/1097; H04L 69/40; H04L 67/36
USPC ........................................................ 709/219
See application file for complete search history.

(56) References Cited

U.S. PATENT DOCUMENTS

| | | | |
|---|---|---|---|
| 7,359,831 B2 | 4/2008 | Shrivastava et al. | |
| 7,783,750 B1 | 8/2010 | Casey et al. | |
| 9,047,348 B2 | 6/2015 | Dayan | |
| 9,311,479 B1* | 4/2016 | Manni | H04L 63/1433 |
| 9,342,431 B2 | 5/2016 | Sluiman et al. | |
| 9,444,819 B2 | 9/2016 | Muppidi et al. | |
| 9,450,945 B1* | 9/2016 | Koeten | H04L 67/10 |
| 9,489,119 B1* | 11/2016 | Smith, Jr. | G06F 3/0486 |
| 2002/0073236 A1* | 6/2002 | Helgeson | G06F 16/258 709/246 |
| 2007/0219992 A1* | 9/2007 | Bollinger | G06F 16/2465 |
| 2008/0082490 A1* | 4/2008 | MacLaurin | G06F 16/951 |

(Continued)

OTHER PUBLICATIONS

Geert Jansen, "Resources", © Copyright 2011, Created using Sphinx 1.5.3, 6 pages, retrieved on May 22, 2017 from: <http://restful-api-design.readthedocs.io/en/latest/resources.html>.

(Continued)

*Primary Examiner* — Abdullahi E Salad
(74) *Attorney, Agent, or Firm* — Tucker Ellis LLP (57) ABSTRACT

In accordance with an accordance, described herein is a system and method for providing non-intrusive context correlation across a plurality of cloud services in different cloud environments. A cloud service context correlator can be configured with each cloud service, and can pass a common identifier through the cloud services. The cloud service context correlator can identify one or more loggers in a cloud service and their types, and create a log formatter for each logger based on its type to inject the common identifier into log messages generated by the logger. The injected common identifier can correlate log messages from the cloud services, and can be used to search for the correlated log messages in a dashboard of a data visualization tool. The cloud service context correlator does not require code changes for each cloud service, and can be applied to a synchronous or asynchronous representational state transfer (REST) flow.

18 Claims, 8 Drawing Sheets

(56) References Cited

U.S. PATENT DOCUMENTS

| | | | | |
|---|---|---|---|---|
| 2008/0114817 | A1* | 5/2008 | Gheorghioiu | G06F 16/2358 |
| 2009/0271468 | A1* | 10/2009 | DiStefano | G06F 9/5072 |
| | | | | 709/201 |
| 2009/0300152 | A1* | 12/2009 | Ferris | G06F 9/5072 |
| | | | | 709/223 |
| 2011/0055385 | A1* | 3/2011 | Tung | G06F 9/5072 |
| | | | | 709/224 |
| 2011/0083167 | A1* | 4/2011 | Carpenter | H04L 67/10 |
| | | | | 726/4 |
| 2011/0295728 | A1* | 12/2011 | Bulumulla | G06F 11/3476 |
| | | | | 705/34 |
| 2012/0060142 | A1* | 3/2012 | Fliess | G06F 8/70 |
| | | | | 717/102 |
| 2012/0151057 | A1* | 6/2012 | Paredes | H04L 12/4641 |
| | | | | 709/225 |
| 2012/0179646 | A1* | 7/2012 | Hinton | G06F 16/25 |
| | | | | 707/607 |
| 2013/0054634 | A1* | 2/2013 | Chakraborty | H04L 67/1091 |
| | | | | 707/769 |
| 2013/0067067 | A1 | 3/2013 | Miri et al. | |
| 2013/0198763 | A1* | 8/2013 | Kunze | G06F 9/542 |
| | | | | 719/318 |
| 2013/0263289 | A1* | 10/2013 | Vijayan | G06F 21/60 |
| | | | | 726/31 |
| 2014/0006094 | A1* | 1/2014 | Doran | G06Q 10/10 |
| | | | | 705/7.28 |
| 2014/0075033 | A1* | 3/2014 | Doering | H04L 41/5054 |
| | | | | 709/226 |
| 2014/0108474 | A1* | 4/2014 | David | G06F 3/0611 |
| | | | | 707/827 |
| 2014/0156724 | A1* | 6/2014 | Said | H04L 67/10 |
| | | | | 709/203 |
| 2014/0337429 | A1* | 11/2014 | Asenjo | H04L 65/403 |
| | | | | 709/204 |
| 2015/0033305 | A1* | 1/2015 | Shear | G06F 21/45 |
| | | | | 726/11 |
| 2015/0113055 | A1* | 4/2015 | Vijayan | G06F 21/60 |
| | | | | 709/203 |
| 2015/0163199 | A1* | 6/2015 | Kailash | H04L 63/0209 |
| | | | | 726/11 |
| 2015/0188927 | A1* | 7/2015 | Santhi | H04L 63/104 |
| | | | | 726/4 |
| 2015/0200958 | A1* | 7/2015 | Muppidi | H04L 41/28 |
| | | | | 726/23 |
| 2016/0119289 | A1* | 4/2016 | Jain | H04L 63/0281 |
| | | | | 726/12 |
| 2016/0127254 | A1* | 5/2016 | Kumar | H04L 47/70 |
| | | | | 709/226 |
| 2016/0164723 | A1* | 6/2016 | Cimprich | H04L 41/0806 |
| | | | | 709/221 |
| 2016/0188317 | A1* | 6/2016 | Hilliar | G06F 8/65 |
| | | | | 717/172 |
| 2016/0314120 | A1* | 10/2016 | Dauderman | G06F 16/447 |
| 2016/0323157 | A1* | 11/2016 | Marvasti | H04L 43/04 |
| 2016/0337175 | A1* | 11/2016 | Rao | H04L 41/0803 |
| 2017/0006118 | A1* | 1/2017 | Dennis | H04L 41/22 |
| 2017/0091208 | A1* | 3/2017 | Quan | G06F 9/50 |
| 2017/0093645 | A1* | 3/2017 | Zhong | G06F 3/0482 |
| 2017/0201569 | A1* | 7/2017 | Fu | H04L 67/34 |
| 2017/0331880 | A1* | 11/2017 | Crofton | H04L 67/06 |
| 2017/0331893 | A1* | 11/2017 | Crofton | H04L 67/1097 |
| 2017/0339221 | A1* | 11/2017 | Wang | H04L 67/1014 |
| 2018/0025021 | A1* | 1/2018 | Jain | H04L 67/1095 |
| | | | | 707/626 |
| 2018/0063176 | A1* | 3/2018 | Katrekar | H04L 63/1425 |
| 2018/0067951 | A1* | 3/2018 | Brandwine | G06F 16/907 |
| 2018/0234444 | A1* | 8/2018 | Kaplan | H04L 63/1425 |
| 2018/0288045 | A1* | 10/2018 | Karunakaran | H04L 63/205 |
| 2018/0295149 | A1* | 10/2018 | Gazit | H04L 63/1441 |
| 2018/0324251 | A1* | 11/2018 | Padmanabh | H04L 67/1097 |
| 2019/0068438 | A1* | 2/2019 | Kumar | H04L 67/2838 |

OTHER PUBLICATIONS

Pamela Clark, "4.2×Documentation / Configuring Application Analytics Business Transaction and Log Correlation" last modified by Jacquie Finney on Jan. 10, 2016, 7 pages, retrieved on Nov. 14, 2016 from: <https://docs.appdynamics.com/display/PRO42/Business+Transaction+and+Log+Correlation>.

Oracle®, Oracle® Application Server Administrator's Guide 10g Release 2 (10.1.2) B13995-08, 5 Managing Log Files, 20 pages, retrieved on Nov. 11, 2016 from: <https://docs.oracle.com/cd/B14099_19/core.1012/b13995/log.htm>.

Raffael Marty, "Cloud Application Logging for Forensics", SAC' 11 Mar. 21-25, 2011, TaiChung, Taiwan, Copyright 2011, ACM, 7 pages.

Matthew Skelton, Manuel Pais, "Why and How to Test Logging", Posted Oct. 29, 2016, 27 pages, retrieved on Nov. 11, 2016 from: <https://www.infoq.com/articles/why-test-logging>.

Christian Pape et al., "RESTful Correlation and Consolidation of Distributed Logging Data in Cloud Environments", ICIW 2013: The Eighth International Conference on Internet and Web Applications and Services, Copyright © IARIA 2013, ISBN: 978-1-61208-280-6, 6 pages.

Pavel Dimitrov et al., "Release Automation: Tools and Infrastructure", SWC RWTH Aachen University, Germany, Copyright © 2014, 98 pages.

"Jersey 2 filter uses Container Request Context in Client Request Filter", edited Aug. 13, 2014, retrieved on Jul. 14, 2020 from https://stackoverflow.com/questions/24995307/jersey-2-filter-uses-container-request-context-in-client-request-filter, 3 pages.

Subramaniam, "REST API Design—Resource Modeling", published Aug. 14, 2014, retrieved on May 22, 2017 from https://www.thoughtworks.com/insights/blog/rest-api-design-resource-modeling, 5 pages.

* cited by examiner

SYSTEM AND METHOD FOR NON-INTRUSIVE CONTEXT CORRELATION ACROSS CLOUD SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud services, and are particularly related to a system and method for providing non-intrusive context correlation across cloud services.

BACKGROUND

A cloud application may need to call a plurality of loosely coupled cloud services. For example, a cloud application, after receiving a request from a client application, may request information from a cloud service for processing the client request. The cloud service in turn may request additional information from one or more other cloud services.

The plurality of cloud services can form a cloud service chain across different cloud environments from different cloud vendors, and use different proprietary technologies.

For debugging and other purposes, it is often necessary to provide context or transaction correlation across the cloud services, or suite decks associated with the cloud services. Existing solutions are either intrusive, require log messages in an application or cloud service to be in a particular format, or require applications or cloud services to be tightly coupled.

Accordingly, it would be beneficial to provide a non-intrusive context correlation solution that works with a plurality of loosely-coupled cloud services and does not require code changes for the cloud services.

SUMMARY

In accordance with an accordance, described herein is a system and method for providing non-intrusive context correlation across a plurality of cloud services in different cloud environments. A cloud service context correlator can be configured with each cloud service, and can pass a common identifier through the plurality of cloud services. The cloud service context correlator can identify one or more loggers in a cloud service and their types, and create a log formatter for each logger based on its type to inject the common identifier into log messages generated by the logger. The injected common identifier can correlate log messages from the plurality of cloud services, and can be used to search for the correlated log messages in a dashboard of a data visualization tool. The cloud service context correlator does not require code changes for each cloud service, and can be applied to a synchronous or asynchronous representational state transfer (REST) flow.

DETAILED DESCRIPTION

In accordance with an embodiment, the system and method described herein can provide non-intrusive context correlation across a plurality of cloud services in different cloud environments.

In accordance with an embodiment, the system does not require a specific module for each cloud service vendor, and does not require code change for each cloud service. Instead, a single cloud service context correlator can be configured for each of the plurality of cloud services as a plug-in, to inject a global execution context identifier (GECID) into log messages generated by the cloud service. The injected GECID can correlate log messages from the plurality of cloud services.

In accordance with an embodiment, at runtime, the cloud service context correlator can automatically instrument log messages with the GECID that is propagated across the cloud services in headers of messages to and from each cloud service. A log handler and a log formatter can be added to each logger declared by a matching resource in a cloud service to format log messages from the logger with the propagated GECID.

In accordance with an embodiment, the system can intercept all outbound requests and responses associated with a cloud service, to check and add the GECID in the contexts of the requests and responses, so that the GECID can be propagated to one or more receiving cloud services and their endpoint resources.

In accordance with an embodiment, the GECID can be a simple universally unique identifier (UUID) or a data structure with embedded contextual metadata.

For example, the embedded metadata can include metadata indicating which cloud service issues a particular request or response, time of issue, and path of travel of the request or response.

As such, the GECID can be utilized in an internal flow trace, in auditing, and in transporting additional business-oriented and/or transaction-oriented metadata from one cloud service to another, without the cloud service being aware of the injection of the GECID into the cloud service.

In accordance with an embodiment, the cloud service context correlator can be plugged into any REST-enabled cloud service as an archive file, for example, a JAR file. The REST-enabled cloud service can reference the plugged-in cloud service context correlator by changing one or more parameters in a configuration file of the cloud service.

In accordance with an embodiment, the plurality of cloud services can be of different types of cloud services, for example, one or more Software as a Service (SaaS) service and one or more Platform as a Service (PaaS) services; use different proprietary technologies; and be provided by different cloud vendors.

Alternatively, the plurality of cloud services can be of the same type, for example, PaaS services. Additionally, the plurality of cloud services can be deployed across multiple domains and data centers.

In accordance with an embodiment, the plurality of cloud services can also reside in a single cloud environment, and be provided by a single cloud provider.

In accordance with an embodiment, the cloud service context correlator can represent a non-intrusive automatic instrumentation and injection mechanism, meaning that no code change is required from the cloud services to correlate their log messages using the GECID. The cloud service context correlator operates on REST resource contexts connecting the cloud services, and on loggers declared by REST resources associated with the cloud services. The cloud service context correlator does not require that log messages to be in a particular format to inject a GECID into the log messages.

With the cloud service context correlator, a developer does not need to consider capturing correlation information during the design and development of a REST (representational state transfer)-enabled cloud service.

In accordance with an embodiment, the cloud service context correlator can be integrated with data visualization tools, for example, LogStash and Kibana; various PaaS audit frameworks; and cloud compliance solutions and applications.

REST Architectural Principles

REST is a set of design principles for building distributed services. In a REST-enabled service or application, every object and resource is reachable through a unique URI. Each HTTP request must contain the URI of the object from which information is requested, or to which information is posted. Each REST-enabled service or application can only use a small, fixed set of HTTP operational methods, including GET, PUT, DELETE, POST, and OPTIONS. Using the fixed set of operations methods can ensure familiarity, Interoperability, and scalability of the service or application.

Another architectural principle of REST is that each service is representation-oriented. Under this principle, each service is addressable through a specific URI and representations are exchanged between a client and service.

For example, with a GET operation, the client can receive a representation of the current state of a resource. A PUT or POST passes a representation of the resource to the server so that the underlying resource's state can change.

In a RESTful system, the complexity of the client-server interaction is within the representations being passed back and forth. The representations can include XML, JSON, YAML, or a customized format.

In a REST-enabled service, there is no client session data stored on a server. The server only records and manages the state of the resources it exposes. If there needs to be session-specific data, the data can be held and maintained by the client and transferred to the server with each request as needed.

Non-Intrusive Cloud Service Context Correlator

Figure 1:
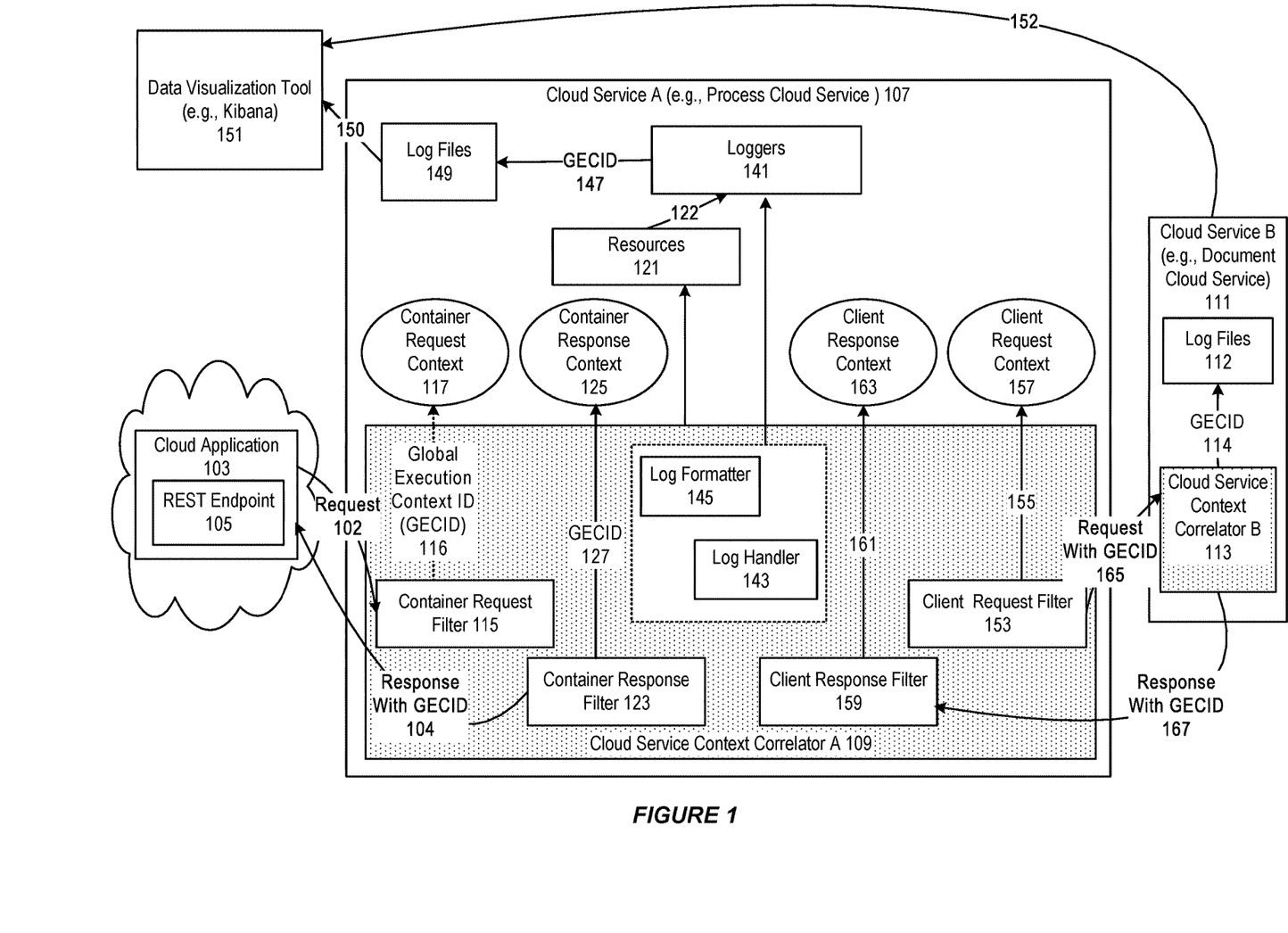
FIG. 1 illustrates a system for providing a non-intrusive context correlation across a plurality of cloud services, in accordance with an embodiment.

FIG. 1 illustrates a system for providing a non-intrusive context correlation across a plurality of cloud services, in accordance with an embodiment.

In accordance with an embodiment, a REST-enabled cloud application 103 can call cloud service A 107 using a REST endpoint 105. Cloud service A can further call cloud service B 111. Cloud service A and cloud service B can be among a plurality of REST-enabled cloud services that form a cloud service chain across a plurality of different cloud environments.

In accordance with an embodiment, each REST-enabled cloud service, for example, cloud service A, can include a plurality of resources 121. Each resource can be an object with a type, associated data, relationships to other resources, and a set of methods (e.g., HTTP GET, POST, PUT and DELETE) that operate on the associated data. Each resource can be identified by a URI, and can represent a document, a row in a database, or the result of running an algorithm. Each resource can be represented by a data model, for example, JavaScript Object Notation (JSON).

In accordance with an embodiment, a cloud service context correlator, for example, cloud service context correlator A 109 and cloud service context correlator B 113, can be plugged into or configured for each cloud service. Each of cloud service context correlator A and cloud service context correlator B can be a JAR file provided as a shared library to a cloud service, which can reference the JAR file. Each cloud service context correlator can be a copy of the same JAR file, and can include the same components.

In accordance with an embodiment, a cloud service context correlator can be placed in a location for a cloud service to reference. The referencing cloud service does not need to change any code to use the shared library; only one or more parameters in a configuration file needs to be changed to reference the shared library.

In accordance with an embodiment, a cloud service context correlator, for example, cloud service context correlator A, can include a container request filer 115, a container response filter 123, a client request filter 153, and a client response filter 159. Each filter can be used to modify or process headers of incoming and outgoing requests or responses.

Specifically, in accordance with an embodiment, the container request filter can operate on inbound requests, the container response filter can operate on outbound responses, the client request filter can operate on outbound requests, and the client response filter can operate on inbound responses.

In accordance with an embodiment, each filter can be associated with a context object, for example, a container request context 117, a container response context 125, a client request context 157, and a client response context 163.

For example, each request context object can include a request URI, message headers, message entity or request-scoped properties, and each response context object can provide message headers, message entity or request-scoped properties.

Each context object can provide request-specific or response-specific information for the filter, and expose setters for modifying the information.

In accordance with an embodiment, the client request filter can intercept an outbound request before the outbound request is sent over to cloud service B. The container request filter can intercept an inbound request after cloud service A receives the inbound request from the REST-enabled cloud application and before a method on a matching resource is invoked. The container response filter can intercept an outbound response after a method on a matching resource is invoked and before the outbound response is sent to the REST-enabled cloud application. The client response filter can be invoked after a response is received from cloud service B and before the response is unmarshalled.

In accordance with an embodiment, the container request filter can intercept an inbound request 102 from the REST-enabled cloud application, and create a new GECID if the inbound request doesn't have one already. The container request filter can further discover all the accessible loggers 141 declared 122 by one or more matching resources from the plurality of resources 121; and can identify the type of each logger, i.e., whether the logger is Oracle Diagnostics Logging (ODL) or log4j.

Based on the type of each logger, the container request filter can create a customized log handler object and a customized formatter object from a log formatter 145 and a log handler 143 in cloud service context correlator A 109. The customized log handler object and customized log formatter object can subsequently added to the logger In accordance with an embodiment, the container request filter can create an in-memory mapping between the GECID and a thread ID of associated with a current thread context that executes the inbound request 102, and populate 116 the GECID into a request header of the container request context 117 if the GECID does not exist in the request header.

In accordance with an embodiment, the customized log handler can be used to look up the GECID from the in-memory mapping using the thread ID, and set the GECID to the current thread context. The customized log formatter can be used to format log messages using the GECID from current thread context. The customized log handler and the customized log formatter can work in a fail-safe mode, i.e. they make the best effort in their processing and make sure they don't cause any failures that can lead to the overall failure in processing the requests and responses.

In accordance with an embodiment, the container response filter 123 can validate the GECID in the current thread context to determine whether the GECID in the current thread context matches the GECID in the request header. If the two GECID's match, the container response filter can populate 127 the GECID in the current thread context into a response header in the container response context, and clean up all mappings and resources from memory.

In accordance with an embodiment, the client request filter can differentiate whether an outbound request 165 is a normal request or an asynchronous status check request, and can create a new GECID if a GECID does not already exist in a request header in the client request context. The new GECID can be populated into 155 the request header, and set to the current thread context if it has not been not set already.

In accordance with an embodiment, the client response filter can populate 161 the GECID from an inbound response 167 into the client response context, validate the GECID against the GECID in the client request context; and identify the type of response based on a response code, i.e. whether the response is synchronous or asynchronous, and if it is asynchronous, whether the response is a status monitor response or an asynchronous status response.

Based on the type of the response, the client response filter can create required in-memory mappings. If the inbound response is an asynchronous status monitor response, a three-way mappings between an URI of the original outbound request, the GECID and a status monitor URI can be created. If the response is an asynchronous status response, and the response code is 200/OK, the client response filter can register the completion event of an ongoing asynchronous operation and clean up the appropriate in-memory mappings.

As described above, the GECID created by the inbound request 102 can be populated into each of the plurality of contexts, so that the GECID can be passed with the outbound request 165 to cloud service B 111, returned from cloud service B in the inbound response 167, and further passed in an outbound response 104 to the calling REST-based cloud application 103.

In accordance with an embodiment, the GECID 117, 114 can be injected into log messages in log files 149 in cloud service A, and log files 112 in cloud service B. As such, the injected GECID can be used to correlate transaction contexts across a plurality of cloud services associated with the REST-enabled cloud application.

As further shown, a data visualization tool 151, for example, Kibana, can perform a federated search across the log files from 150, 152 the plurality of cloud services using the GECID.

Figure 2:
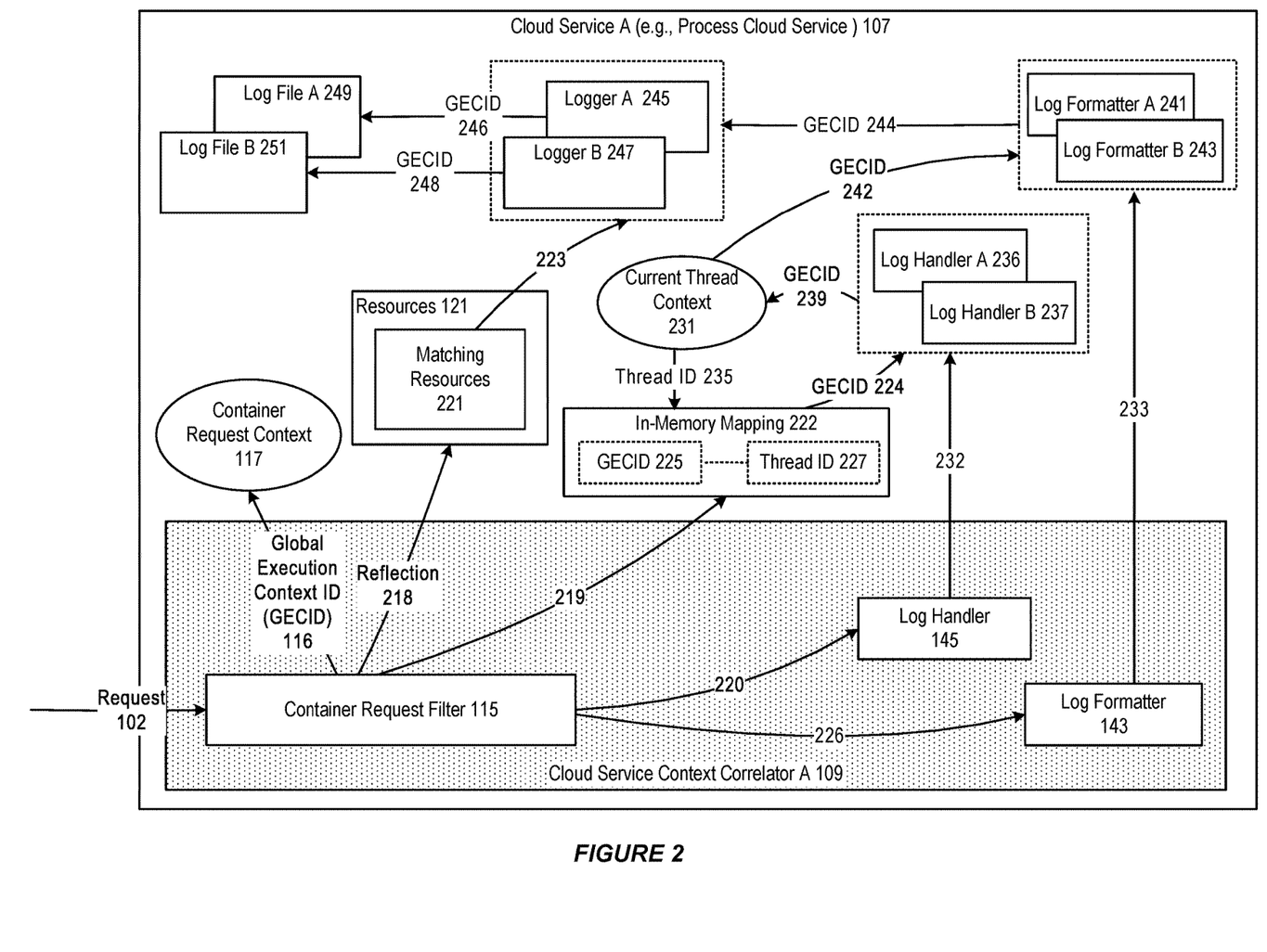
FIG. 2 further illustrates a system for providing a non-intrusive context correlation across a plurality of cloud services, in accordance with an embodiment.

FIG. 2 further illustrates a system for providing a non-intrusive context correlation across a plurality of cloud services, in accordance with an embodiment.

More particularly, FIG. 2 describes injecting the GECID into log messages in a cloud service in accordance with an embodiment.

In accordance with an embodiment, the system can intercept all Inbound requests and propagate the GECID to the accessible loggers declared by matching REST resources. The loggers can include all inheritable loggers if they are accessible. The auto-instrumentation can be invisible to service developers, thereby making it non-intrusive to their existing code.

In accordance with an embodiment, the auto-instrumentation can be achieved using java.lang.reflection in order to dynamically discover the loggers that are accessible through the REST resources.

As shown in FIG. 2, the container request context 117 can provide a handle to a list of matching REST resources 221 which are configured to service the REST endpoint 105 as described in FIG. 1.

In accordance with an embodiment, the container request filter can discover 218 the list of matching resources using a reflection application programming interface (API), for example, java.lang.reflection. The reflection API can inspect a resource object at runtime to determine methods and properties of the resource object, which can declare one or more loggers using the properties.

In accordance with an embodiment, the matching resources 221 can declare 223 a plurality of loggers, for example, logger A 245 and logger B 247. The loggers can be of different types. For example, logger A can be Oracle Diagnostics Logging (ODL), and logger B can be log4j.

In accordance with an embodiment, the container request filter can identify the type of each logger. Based on the type of each logger, the container request filter can create a customized log handler object from the log formatter 145, and a customized formatter from the log handler 143.

For example, log customized handler A 236 and customized log handler B 237 can be created respectively for logger A and logger B based on 232 the log handler 145 at the invocation 220 of the container request filter. Similarly, customized log formatter A 241 and customized log formatter B 243 can be created respectively for logger A and logger B based on 233 the log handler 145 at the invocation 226 of the container request filter.

In accordance with an embodiment, the container request filter can create 219 an in-memory mapping 222 between the GECID 225 and a thread ID 227 from 235 a current thread context 231. Each customized log handler can look up the GECID from 224 from the in-memory mapping using the thread ID and set 239 the GECID to the current thread context.

In accordance with an embodiment, the in-memory mapping can be a data structure that can be dynamically created and destroyed by the cloud service context correlator.

As further shown in FIG. 2, each customized log formatter can retrieve 242 the GECID from the current thread context, and pass 244 the retrieved GECID to a corresponding logger, for example, logger A 245 and logger B 247. Each logger can inject the GECID 246, 248 into log messages in a log file 249, 251 generated by the logger.

In accordance with an embodiment, the GECID can be injected for all logging levels, or one or more logging levels (e.g. INFO and/or NOTIFICATION) as configured.

Figure 3:
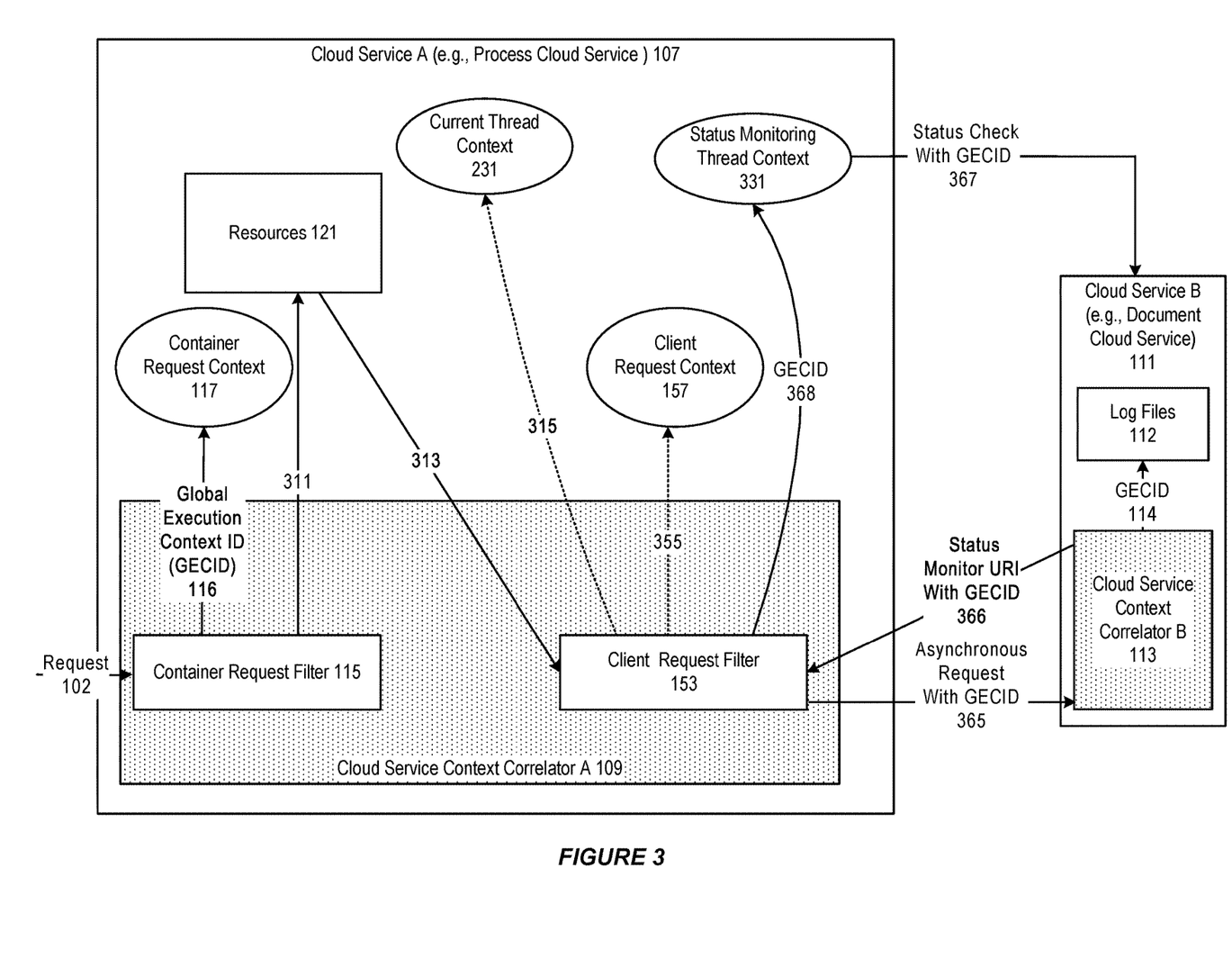
FIG. 3 further illustrates a system for providing a non-intrusive context correlation across a plurality of cloud services, in accordance with an embodiment.

FIG. 3 further illustrates a system for providing a non-intrusive context correlation across a plurality of cloud services, in accordance with an embodiment.

As shown in FIG. 3, the system can be used to correlate an asynchronous REST flow.

In accordance with an embodiment, the container request filter can intercept the inbound request 102 after cloud service A receives the inbound request from the REST-enabled cloud application and before a method on a matching resource is invoked 311. The intercepted inbound request can be processed by cloud service A, which can further call cloud service B asynchronously using an asynchronous request 365.

As shown in FIG. 2, information required for calling cloud service B can be passed 313 from the container request context through the matching resource to the client request filter, which is configured to intercept the asynchronous outbound request before the request is sent over to cloud service B.

In accordance with an embodiment, the client request filter can check whether a GECID already exists in the current thread context or another source. If no GECID is found in any source, the client request filter can create a GECID and set 315, 355 the newly created GECID to the current thread context and the client request context.

In accordance with an embodiment, since in this example the GECID already exists in the current thread context, the client request filter can send the asynchronous request with the GECID to cloud service B with a PUT, POST, DELETE, or GET operation. Cloud service B can return a status code (e.g., 202) that indicates that the request has been accepted along with a status monitor URI 366 specifying a location where cloud service A can use to monitor the status of the request.

In accordance with an embodiment, as in cloud service A, the GECID received in cloud service B from the asynchronous request can be injected into log messages generated by loggers declared by matching resources that are configured to service cloud service B.

In accordance with an embodiment, cloud service A that acts a client to cloud service B can use a different thread associated with a status monitor execution context 331 to send a status check request 367 to the status monitor URI for available data. If data is available, a response can be returned with the GECID.

In accordance with an embodiment, the asynchronous request 365 and the status check request 367 are in two different threads; however, the client request filter can set the GECID 368 to the status monitoring execution context, so that the two threads can be correlated by the same GECID, which can be used to create a 3-way mapping between the original asynchronous request 365, the GECID and the status monitor URI.

Figure 4:
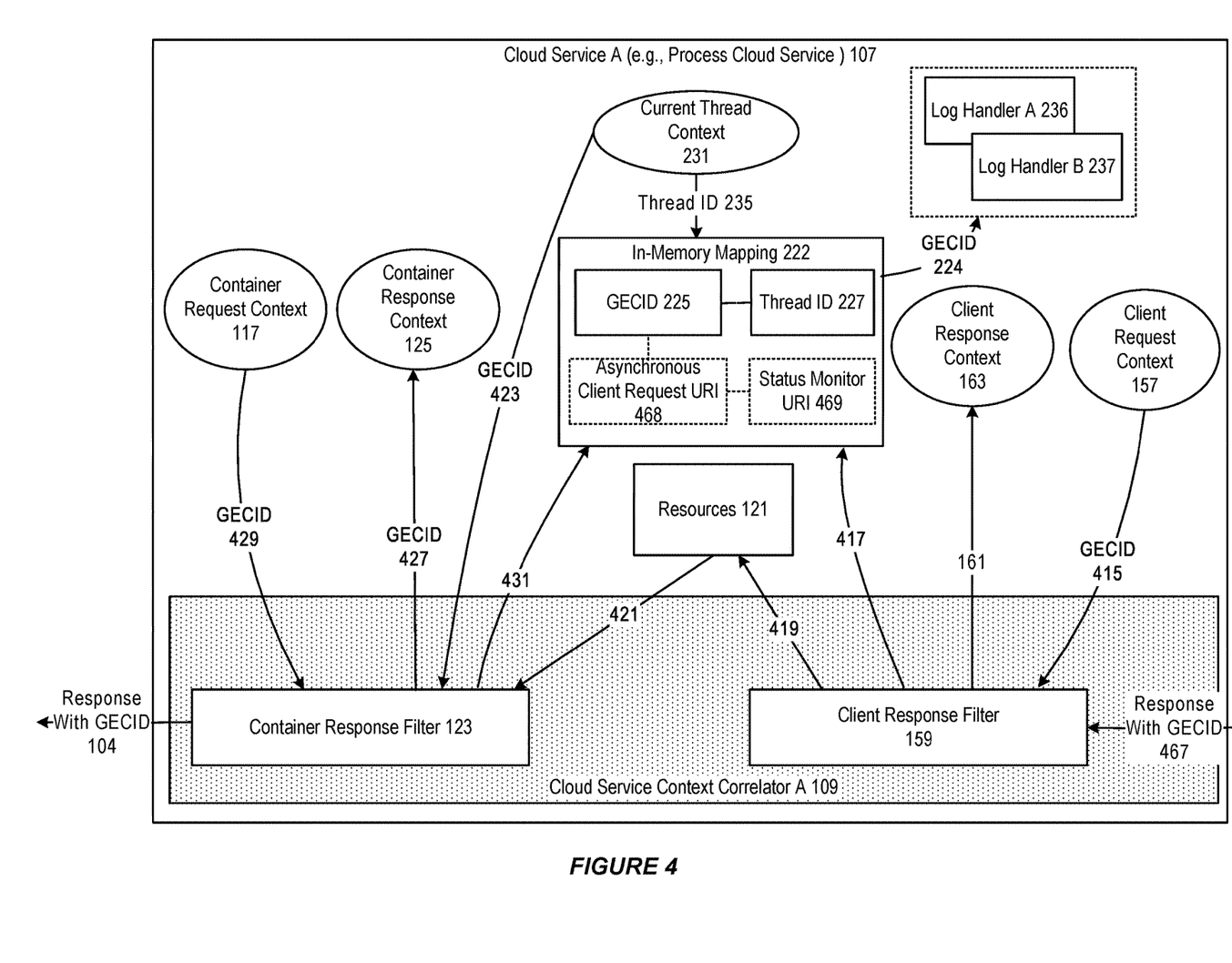
FIG. 4 further illustrates a system for providing a non-intrusive context correlation across a plurality of cloud services, in accordance with an embodiment.

FIG. 4 further illustrates a system for providing a non-intrusive context correlation across a plurality of cloud services, in accordance with an embodiment.

In accordance with an embodiment, a response with the GECID 467 can be returned from cloud service B after data is available at the status monitor URI as described in FIG. 3.

In accordance with an embodiment, the response 467 can first be received by the client response filter, which can validate the GECID from the response against the GECID from 415 the request context. If the two GECID's do not match, an error message can be generate to indicate the mismatch, and the error message can be output to one of the log files in cloud service A. The GECID from the response can subsequently be ignored in cloud service A.

In accordance with an embodiment, the client response filter can identify the type of response based on a response code, i.e. whether the response 467 is a status monitor response or an asynchronous status response.

In accordance with an embodiment, if the response is a status monitor response, the client response filter can create a three-way mappings between an URI of the original outbound request 468, the GECID 225 and the status monitor URI 469.

In accordance with an embodiment, the three-way mapping can be used to correlate the original asynchronous request URI with the asynchronous status check endpoint URI (i.e. the status monitor URI), to correlate all the status check requests and responses in the ongoing asynchronous operation, and to track the final result of the asynchronous operation with respect to the original asynchronous request.

If the response is an asynchronous status response, and the response code is 200/OK, the client response filter can register a completion event of the asynchronous operation and clean up 417 the three-way in-memory mappings.

As further shown in FIG. 4, information from the response 467 can be passed from 419 the client response filter through a matching resource to 421 the container response filter, which can validate the GECID from 423 the current thread context against the GECID from 429 the container request context. If the two GECID's match, the container response filter can populate 427 the GECID from the current thread context into the container response context, and clear up 431 all the remaining in-memory mappings (e.g., the mapping between the GECID 225 and the thread ID 227) and resources from memory.

In accordance with an embodiment, cloud service A can return a response with the GECID to the REST-enabled cloud application. The GECID can then be displayed to a user of the cloud application. The user can use the GECID to search for all correlated log messages and other correlated context information in a federated search in a data visualization tool such as Kibana.

Figure 5:
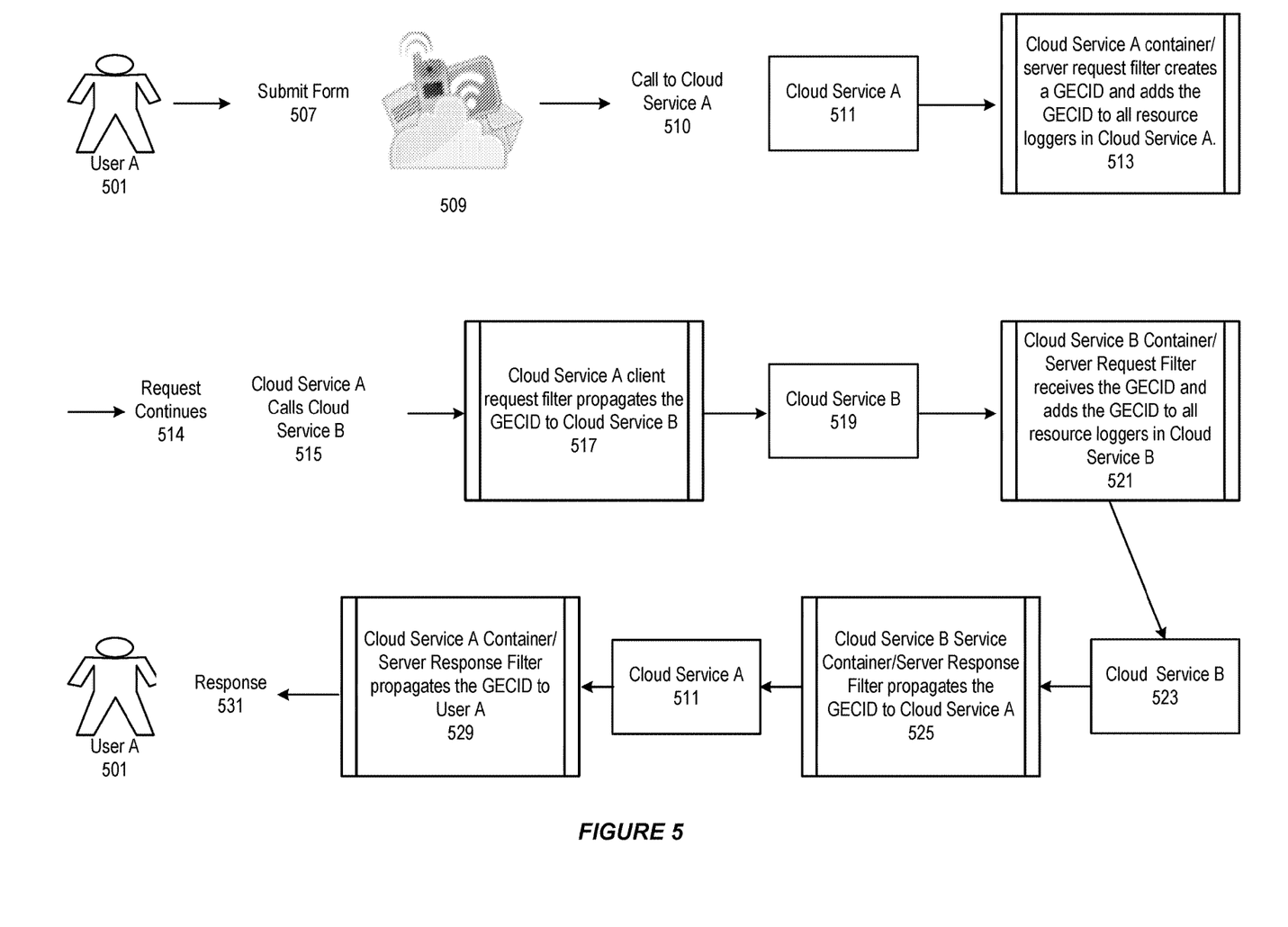
FIG. 5 illustrates a correlation identifier injection flow in accordance with an embodiment.

FIG. 5 illustrates a correlation identifier injection flow in accordance with an embodiment.

As shown in FIG. 5, at step 507, user A 101 submits a form via a cloud application on a mobile device 509.

At step 510, the cloud application calls cloud service A 511.

At step 513, a container/server request filter 513 in cloud service A creates a GECID and adds the GECID to all resource loggers in cloud service A.

At step 515, as the request continues 514, cloud service A calls cloud service B.

At step 517, a client request filter in cloud service A propagates the GECID to cloud service B 519.

At step 521, cloud service B container/server request filter receives the GECID and adds the GECID to all resource loggers in cloud service B 523.

At step 525, cloud service B container/server response filter propagates the GECID to cloud service A 511.

At step 529, cloud service A container/server response filter propagates the GECID in a response 531 to user A 501.

Figure 6:
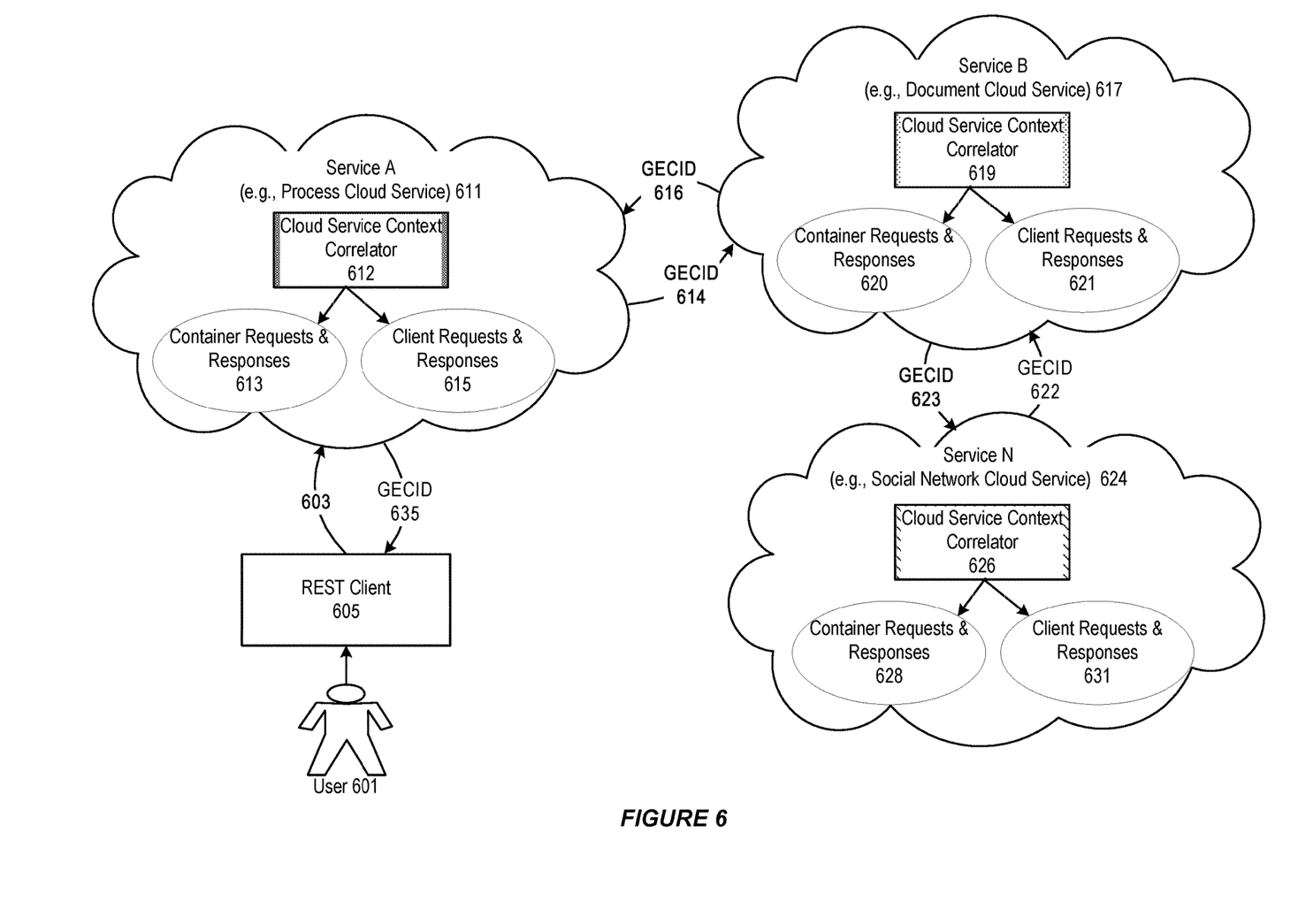
FIG. 6 illustrates a service correlation flow in accordance with an embodiment.

FIG. 6 illustrates a service correlation flow in accordance with an embodiment.

In accordance with an embodiment, each of cloud service A 611, cloud service B 617 and cloud service N 624 in a service chain can be a REST-enabled PaaS cloud service.

For example, cloud service A can be a process cloud service, cloud service B can be a document cloud service, and cloud service N can be a social network cloud service.

As shown in FIG. 6, each cloud service can be configured to reference a cloud service context correlator 612, 619 and 626. Each cloud service context correlator can operate on inbound requests and outbound responses 613, 620 and 628, and outbound requests and inbound responses 615, 621 and 631.

In accordance with an embodiment, the cloud service context correlators can propagate a GECID from cloud service A to cloud service B, and from cloud service B to cloud service N, and back through the service chain; and create a context correlation across the plurality of cloud services, including injecting the GECID into log messages from each cloud service and correlating the log messages using the GECID.

In accordance with an embodiment, a REST client 605 sends the request 603 to cloud service A whose container request filter creates a GECID. Cloud service A makes a request to cloud service B whose container request filter receives the GECID 614 from the client request filter in cloud service A.

As further shown, cloud service B makes a request to cloud service N whose container request filter receives the GECID 623 from the client request filter in cloud service B.

In accordance with an embodiment, cloud service N responds to cloud service B with the GECID 622 that is validated by the client response filter and/or the container response filter in cloud service B. Cloud service B responds to cloud service A with the GECID 616 that is validated by the client response filter and/or the container response filter in cloud service A.

In accordance with an embodiment, service A returns a response with the GECID 635 to the REST client in a header of the response. The REST can converts the GECID to a transaction ID and return the transaction ID to a user 601.

Figure 7:
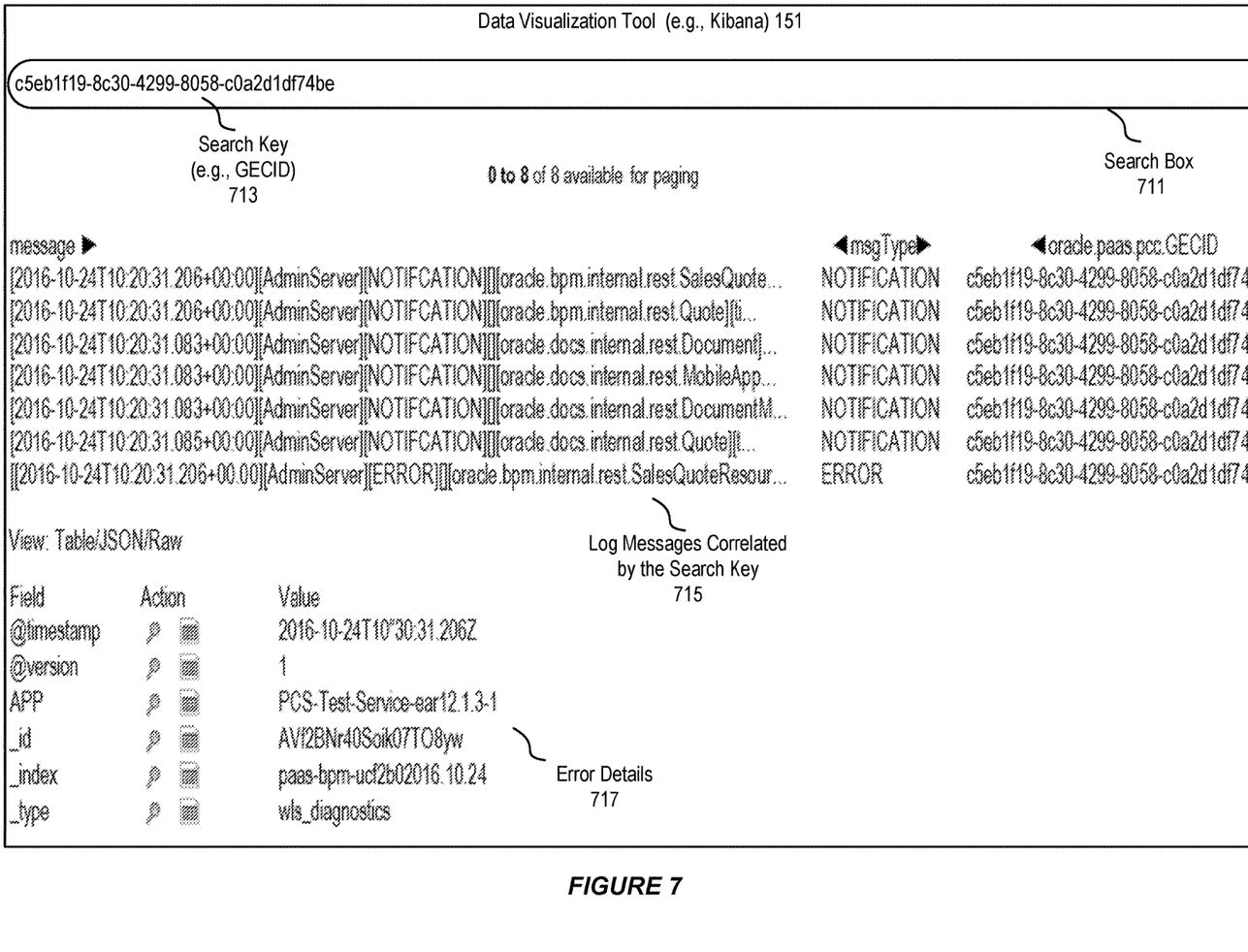
FIG. 7 illustrates example correlated log messages retrieved using a data visualization tool in accordance with an embodiment.

FIG. 7 illustrates example correlated log messages retrieved using a data visualization tool in accordance with an embodiment.

As shown in FIG. 7, the data visualization tool, for example, Kibana, can include a dashboard with a search box 711 that allows a user to use a search key 713 or a transaction ID, to search for log messages correlated by the search key.

In accordance with an embodiment, the log messages correlated by the search key 715 can include log messages from a plurality of cloud services. The log messages also includes one or more error log entries, which can be expanded for a user to view additional details 717 about the error entries.

Figure 8:
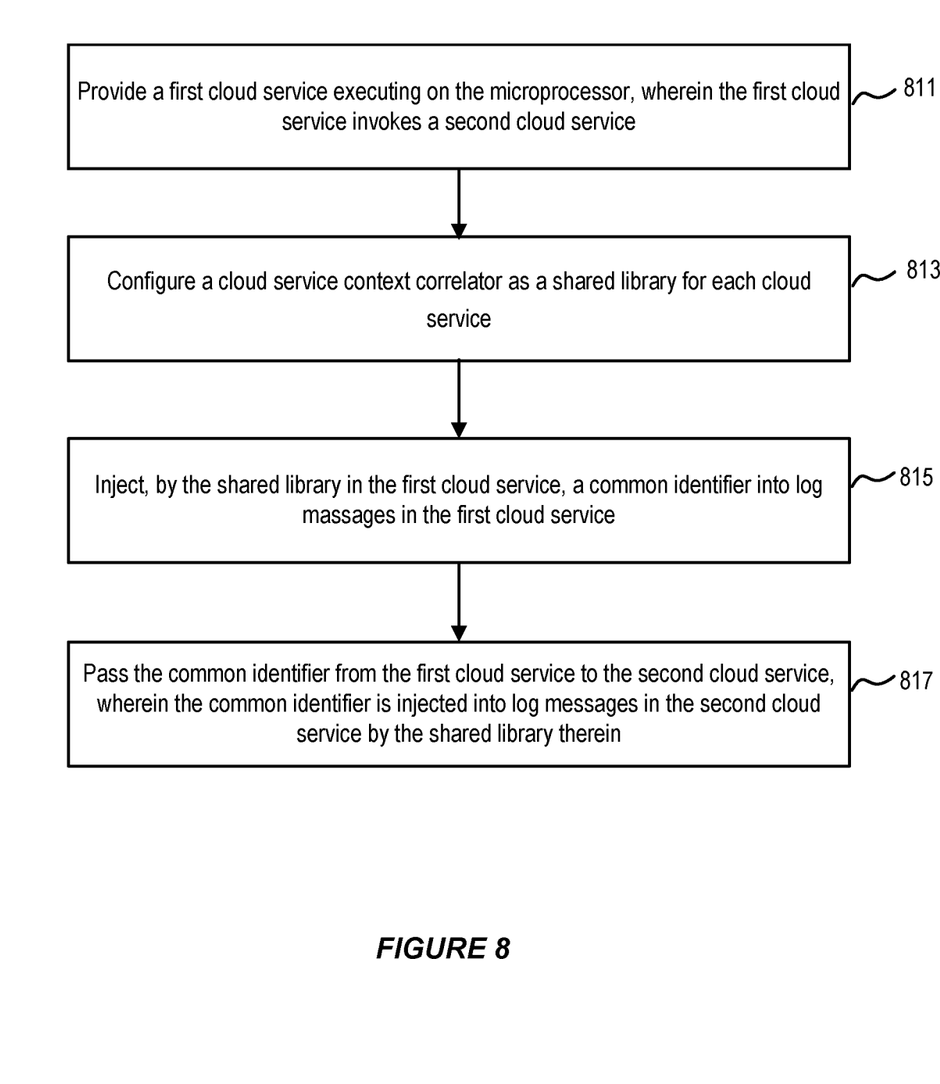
FIG. 8 illustrates a method for providing a non-intrusive context correlation across a plurality of cloud services, in accordance with an embodiment.

FIG. 8 illustrates a method for providing a non-intrusive context correlation across a plurality of cloud services, in accordance with an embodiment.

As shown in FIG. 8, at step 811, a first cloud service executing on the microprocessor is provided, wherein the first cloud service invokes a second cloud service.

At step 813, a cloud service context correlator is configured as a shared library for each cloud service.

At step 815, the shared library in the first cloud service injects a common identifier into log messages in the first cloud service.

At step 817, the common identifier is passed from the first cloud service to the second cloud service, wherein the common identifier is injected into log messages in the second cloud service by the shared library therein.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for providing a non-intrusive context correlation across a plurality of cloud services, comprising:
   a microprocessor;
   a first cloud service executing on the microprocessor, wherein the first cloud service invokes a second cloud service;
   a first cloud service context correlator provided at the first cloud service;
   wherein the second cloud service includes a second cloud service context correlator, and wherein each of the first cloud service context correlator and the second cloud service context correlator includes a container request filter operable to map between execution context identifiers and thread identifiers associated with thread contexts that execute requests;
   wherein the first cloud service is associated with a loq handler operable to:
      set an execution context identifier to a current thread context, and
      pass the execution context identifier to a logger for injection into first log messages at the first cloud service;
   wherein the first cloud service passes the execution context identifier to the second cloud service in association with a request to be processed by the first cloud service and the second cloud service;
   wherein the execution context identifier is injected into second log messages at the second cloud service by the second cloud service context correlator; and
   wherein the execution context identifier is used to correlate a transaction context across a plurality of cloud services including the first cloud service and the second cloud service, as indicated by the execution context identifier injected into the first loq messages and the second loq messages at those cloud services.

2. The system of claim 1, wherein each of the first cloud service and the second cloud service is a representational state transfer (REST) cloud service.

3. The system of claim 1, wherein each of the first cloud service context correlator and second cloud service context correlator is placed in a location in each of the first cloud service and second cloud service respectively, and is referenced by the cloud service.

4. The system of claim 1, wherein the execution context identifier is a unique string identifier or a data structure that includes a string identifier and additional metadata.

5. The system of claim 1, wherein the cloud service context correlator in each of the first cloud service and second cloud service is configured to:
   identify one or more loggers declared by resources that service the cloud service,
   determine a type of each identified logger, and
   create a customized log formatter to format log messages generated by the associated logger.

6. The system of claim 1, wherein each of the first cloud service context correlator and second cloud service context correlator is configured to correlate log messages generated in a synchronous REST flow and an asynchronous REST flow.

7. The system of claim 1, wherein each of the first cloud service and the second cloud service is a Platform as a Service (PaaS) cloud service.

8. The system of claim 1, wherein the first cloud service and the second cloud service are of different types of cloud services.

9. The system of claim 1,
wherein the first cloud service operates in a first cloud environment, and the second cloud service operates in a second cloud environment; and
wherein the first cloud environment and the second cloud environment use different proprietary technologies, and are provided by different cloud providers.

10. A method for providing a non-intrusive context correlation across a plurality of cloud services, comprising:
providing a first cloud service executing on a computer including a microprocessor, wherein the first cloud service invokes a second cloud service;
providing a cloud service context correlator at each of the first cloud service and the second cloud service, wherein each of a first cloud service context correlator and a second cloud service context correlator includes a container request filter operable to map between execution context identifiers and thread identifiers associated with thread contexts that execute requests;
at the first cloud service:
setting an execution context identifier to a current thread context, and
passing the execution context identifier to a logger for injection into first log messages at the first cloud service;
passing the execution context identifier from the first cloud service to the second cloud service in association with a request to be processed by the first cloud service and the second cloud service;
at the second cloud service:
injecting the execution context identifier into second log messages at the second cloud service;
wherein the execution context identifier is used to correlate a transaction context across a plurality of cloud services including the first cloud service and the second cloud service, as indicated by the execution context identifier injected into the first loq messages and the second loq messages at those cloud services.

11. The method of claim 10, wherein each of the first cloud service and the second cloud service is a representational state transfer (REST) cloud service.

12. The method of claim 10, wherein each of the first cloud service context correlator and second cloud service context correlator is placed in a location in each of the first cloud service and second cloud service respectively, and is referenced by the cloud service.

13. The method of claim 10, wherein the execution context identifier is a unique string identifier or a data structure that includes a string identifier and additional metadata.

14. The method of claim 10, wherein the cloud service context correlator in each of the first cloud service and second cloud service is configured to:
identify one or more loggers declared by resources that service the cloud service,
determine a type of each identified logger, and
create a customized log formatter to format log messages generated by the associated logger.

15. The method of claim 10, wherein each of the first cloud service context correlator and second cloud service context correlator is configured to correlate log messages generated in a synchronous REST flow and an asynchronous REST flow.

16. The method of claim 10, wherein each of the first cloud service and the second cloud service is a Platform as a Service (PaaS) cloud service.

17. The method of claim 10,
wherein the first cloud service operates in a first cloud environment, and the second cloud service operates in a second cloud environment; and
wherein the first cloud environment and the second cloud environment use different proprietary technologies, and are provided by different cloud providers.

18. A non-transitory computer readable storage medium, including instructions stored thereon which when read and executed by one or more computers cause the one or more computers to perform the steps comprising:
providing a first cloud service executing on a computer including a microprocessor, wherein the first cloud service invokes a second cloud service;
providing a cloud service context correlator at each of the first cloud service and the second cloud service, wherein each of a first cloud service context correlator and a second cloud service context correlator includes a container request filter operable to map between execution context identifiers and thread identifiers associated with thread contexts that execute requests;
at the first cloud service:
setting an execution context identifier to a current thread context, and
passing the execution context identifier to a logger for injection into first loq messages at the first cloud service;
passing the execution context identifier from the first cloud service to the second cloud service in association with a request to be processed by the first cloud service and the second cloud service;
at the second cloud service:
injecting the execution context identifier into second log messages at the second cloud service;
wherein the execution context identifier is used to correlate a transaction context across a plurality of cloud services including the first cloud service and the second cloud service, as indicated by the execution context identifier injected into the first loq messages and the second loq messages at those cloud services.

* * * * *

UNITED STATES PATENT AND TRADEMARK OFFICE
CERTIFICATE OF CORRECTION

PATENT NO. : 10,873,628 B2  
APPLICATION NO. : 15/621454  
DATED : December 22, 2020  
INVENTOR(S) : Muthiah et al.

Page 1 of 1

It is certified that error appears in the above-identified patent and that said Letters Patent is hereby corrected as shown below:

In the Specification

In Column 5, Line 18, after "logger" insert -- . --.

In the Claims

In Column 12, Line 18, in Claim 1, delete "loq" and insert -- log --, therefor.

In Column 12, Line 36, in Claim 1, delete "loq" and insert -- log --, therefor.

In Column 12, Line 37, in Claim 1, delete "loq" and insert -- log --, therefor.

In Column 13, Line 38, in Claim 10, delete "loq" and insert -- log --, therefor.

In Column 13, Line 39, in Claim 10, delete "loq" and insert -- log --, therefor.

In Column 14, Line 38, in Claim 18, delete "loq" and insert -- log --, therefor.

In Column 14, Line 51, in Claim 18, delete "loq" and insert -- log --, therefor.

In Column 14, Line 52, in Claim 18, delete "loq" and insert -- log --, therefor.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*